Patented Mar. 4, 1924.

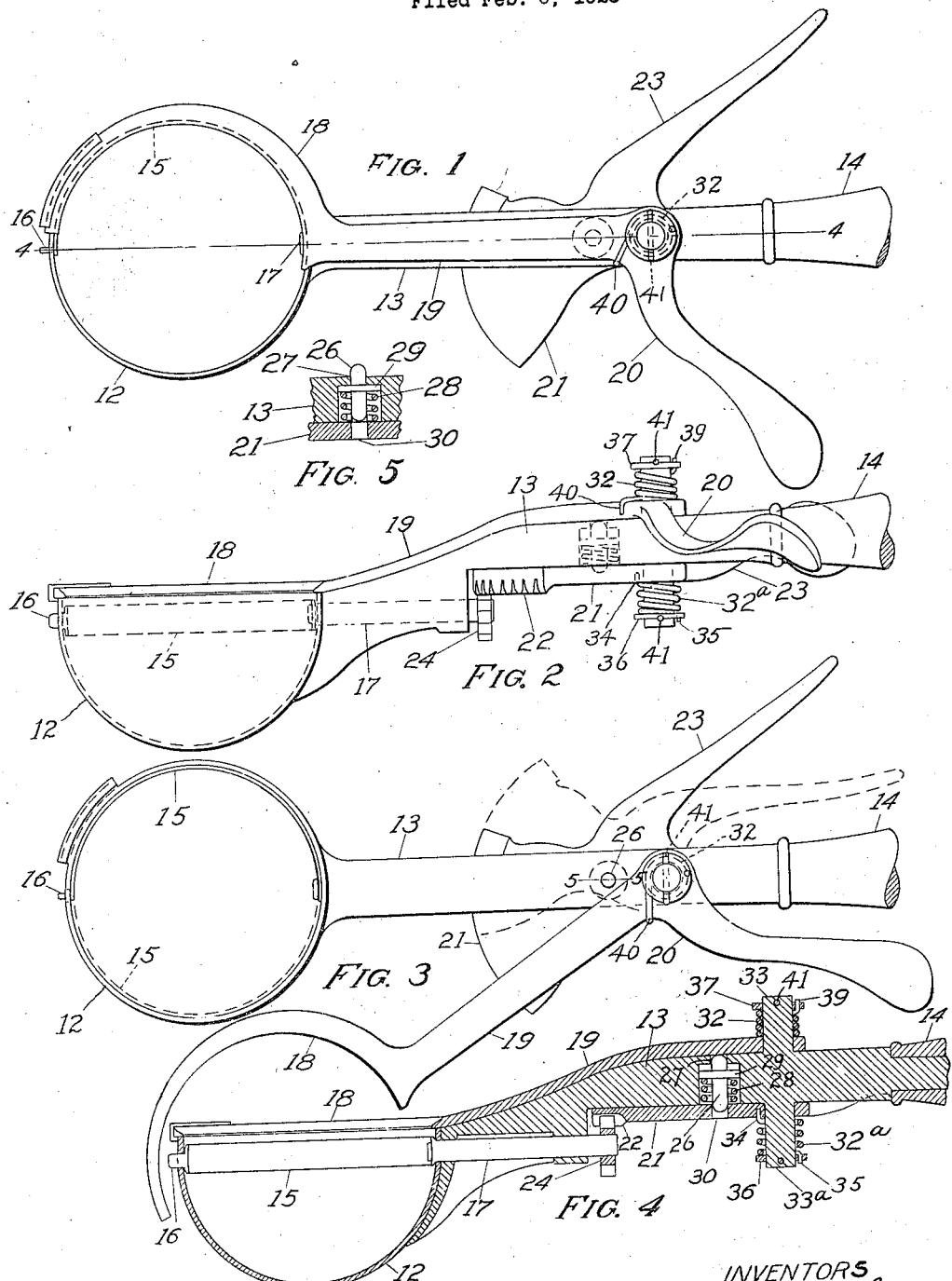

1,485,677

UNITED STATES PATENT OFFICE.

GEORGE E. HOLMES AND FRANK W. GRANT, OF DOVER, NEW HAMPSHIRE.

ICE-CREAM DISHER.

Application filed February 6, 1923. Serial No. 617,221.

*To all whom it may concern:*

Be it known that we, GEORGE E. HOLMES and FRANK W. GRANT, citizens of the United States, residing at Dover, in the county of Strafford and State of New Hampshire, have invented new and useful Improvements in Ice-Cream Dishers, of which the following is a specification.

This invention relates to an ice-cream disher or spoon of the type shown by Letters Patent of the United States, No. 1,188,757, granted to us June 27, 1916, said disher comprising a bowl attached to a shank or handle, a bail-shaped scraper in the bowl to loosen a mass of ice-cream therein, a cleaver blade movable across the top edge of the bowl, to level the said mass, means for normally holding the scraper and cleaver in initial positions at one side of the bowl, and means for operating said cleaver and scraper, locking means being provided for preventing the operation of the scraper until the cleaver has been partially moved from its initial position, in order that the mass may not be prematurely released by the scraper before it has been leveled by the cleaver.

In the structure disclosed by said patent we embodied the said locking means in an extension piece on the scraper, and a projecting lug on the cleaver cooperating with said extension piece in locking the scraper when the cleaver and the scraper are in their initial positions.

The chief object of the present invention is to provide improved locking means, adapted to lock the scraper more positively, by locking the scraper operating means, thus insuring less liability of lost motion than heretofore, the locking means being adapted, also, to be more conveniently installed.

Another object is to simplify and improve the means for normally holding the scraper and the cleaver in their initial positions.

We attain the above-mentioned and other related objects by the improvements hereinafter described and claimed.

Of the accompanying drawings forming a part of this specification,—

Figure 1 is a top plan view of an ice-cream disher embodying our improvements, the scraper and the cleaver being in their initial positions.

Figure 2 is a side view of the same.

Figure 3 is a view similar to Figure 1, showing by full lines the cleaver, moved from its initial position, and by dotted lines, the scraper moved from its initial position.

Figure 4 is a section on line 4—4 of Figure 1.

Figure 5 is a fragmentary section on line 5—5 of Figure 3.

The same reference characters indicate the same parts in all the figures.

The bowl 12 of the disher is fixed to one end of the shank 13, the latter having a suitable handle 14. The curved or bail-shaped scraper 15 conforms to the interior of the bowl, and has at one end a trunnion 16, journaled in an orifice in the bowl. The opposite end of the scraper is fixed to a rock-shaft 17, journaled in bearings carried by the bowl and the shank, and is movable from side to side of the bowl.

The cleaver 18, preferably a sickle-shaped blade, conforming to one side of the top or mouth of the bowl, is movable across the top edge of the bowl, and is fixed to a shank 19, forming one of the arms of a two-armed operating lever, called the cleaver lever, and pivoted to the shank. The other arm 20 of this lever projects from one side of the shank, and is manually movable.

Another two-armed lever, called the scraper lever, is pivoted to the shank, and includes an arm 21, having teeth 22, forming a segmental rack, and an arm 23 which projects from the opposite side of the shank, and is manually movable.

The rack teeth 22 mesh with a pinion 24, fixed to the rock-shaft 17, said teeth, pinion, and shaft constituting torque-transmitting connections, causing the scraper to swing on an axis at right angles to the axis on which the scraper lever is swung. The scraper and the cleaver are normally held in initial positions at one side of the bowl, as shown by Figure 1, by spring pressure acting through the said levers and connections, substantially as in the disher of our above-mentioned patent, the construction and arrangement being such that inward pressure on the lever arm 20, moves the cleaver 18 from its initial position across the bowl, as shown by Figure 3, while inward pressure on the lever 23 moves the scraper 16 from its initial position at one side of the bowl to the other side, each member being returned to its initial position by the spring pressure, when the accompanying lever is released, all substantially as in our former patent.

In carrying out the present invention, we substitute for the means shown by said patent, for locking the scraper so that it cannot be operated before the operation of the cleaver, locking means located on the shank 13, and operable by the movement of the cleaver lever to its initial position, to lock the scraper lever directly to the shank, and operating automatically after movement of the cleaver from said position, to release the scraper lever and permit its operation. While said locking means may be variously embodied, we prefer the following embodiment.

26 represents a locking pin movable in a guide 27, in the shank 13. The upper end of said pin is rounded, and is normally caused to project above the shank and into the path of the cleaver-lever arm 19, by a spring 28, which is supported by the scraper-lever arm 21, and bears on a flange 29 on the locking pin. When the cleaver in moving from the projected position shown by Figure 3, reaches the initial position, the lever arm 19 encounters the rounded projecting end of the pin 26, and depresses the pin against the pressure of the spring, thereby causing the lower end of the pin to enter a socket 30, formed for its reception in the scraper-lever arm 21. The scraper lever is thus locked to the shank 13, and locks the scraper through the above-described connections. When the cleaver is again projected, the lever arm 19, uncovers the locking pin, which is raised by the spring, and releases the scraper lever, as shown by Figure 5.

The lower portion of the guide 27 is enlarged, to receive the flange 29 and form a stop shoulder, limiting the upward movement of the pin by the spring.

It will be seen that locking means located on the shank, and adapted to alternatively lock and release the scraper lever, as described, may be conveniently installed at any desired point on the shank, and is adapted to positively lock the scraper against the possibility of loose motion.

It is not necessary that the locking-pin 26 be round, as it could be square, or any desired cross section, a correspondingly shaped socket being provided for its reception in the scraper operating lever.

The locking means here shown may be installed by simply inserting the pin 26 and spring 28 in the guide 27, before the levers are connected with the shank. When the lever arm 21 is in place, it acts at all times as a support for the spring 28, so that the spring and the pin cannot drop from the guide 27.

We prefer to exert the above-mentioned spring pressure upon the cleaver and scraper levers, by two helical torsional springs 32 and 32$^a$, coiled on alined studs 33 and 33$^a$, fixed to and projecting from opposite sides of the shank 13. The cleaver lever 19—20 has a socket at the junction of its arms, fitted to turn on the stud 33. The scraper lever 21—23 has a similar socket, fitted to turn on the stud 33$^a$.

One end of the spring 32 is engaged at 39 with a head 37, secured to the stud 33, and the opposite end is engaged at 40 with the cleaver lever. One end of the spring 32$^a$ is engaged at 35 with a head 36, secured to the stud 33$^a$, and the opposite end is engaged at 34 with the scraper lever.

The heads 36 and 37 are preferably annular washers, having grooves in their outer sides, receiving pins 41 fixed to the studs, the heads being pressed outward against said pins by the springs, so that the heads are prevented from turning on the studs.

The levers are coaxial or oscillatable on a common axis formed by the studs, and the described parts are compactly arranged and adapted to be conveniently assembled and separated.

The arrangement is such that the effort of the springs 32 and 32$^a$ to expand, causes the springs to press the levers in the directions required to force the cleaver and the scraper to their initial positions.

We claim:

1. An ice-cream disher comprising a shank, a bowl fixed to the shank, a scraper conforming to the interior of the bowl, and movable from side to side thereof, a cleaver movable across the top edge of the bowl, operating mechanism including a cleaver-operating lever connected with the cleaver, a scraper-operating lever connected with the scraper, and spring means normally holding the cleaver, the scraper and the said levers in initial positions with the cleaver and the scraper at one side of the bowl, the said levers being manually movable to shift the cleaver and the scraper from their initial positions; and locking means on the shank, operable by the movement of the cleaver lever to its initial position, to lock the scraper lever to the shank, and operating automatically after the movement of the cleaver lever from said position, to release the scraper lever and permit its operation.

2. An ice-cream disher comprising a shank, a bowl fixed to the shank, a scraper conforming to the interior of the bowl, and movable from side to side thereof, a cleaver movable across the top edge of the bowl, operating mechanism including a cleaver-operating lever connected with the cleaver, a scraper-operating lever connected with the scraper, and spring means normally holding the cleaver, the scraper and the said levers in initial positions with the cleaver and the scraper at one side of the bowl, the said levers being manually movable to shift the cleaver and the scraper from their initial positions; and a spring-pressed locking-pin movable in a guide in the shank, normally held in the path of the cleaver lever, and movable by the movement of said lever to its initial position, into the path of the scraper lever, the latter being provided with a socket to receive said pin.

3. An ice-cream disher comprising a shank, a bowl fixed to the shank, alined studs fixed to and projecting oppositely from the shank, a scraper conforming to the interior of the bowl and movable from side to side thereof, a cleaver movable across the top edge of the bowl, a two-armed cleaver-operating lever, oscillatable on one of said studs, one arm of the lever being fixed to the cleaver, and the other arm manually movable, a two-armed scraper-operating lever, oscillatable on the other stud and having an arm provided with a segmental rack and a manually movable arm, the said levers being coaxial, torque-transmitting connections between said rack and the scraper, and torsional springs coiled on said studs, one spring engaged with one of the studs and with the scraper lever, and the other spring engaged with the other stud and with the cleaver lever, the said springs normally holding the cleaver, the scraper, and the said levers in their initial positions, and permitting independent manual movement of the levers.

4. An ice-cream disher substantially as specified by claim 3, the said springs being engaged with the studs by annular grooved heads, connected with the springs and pressed outward thereby into engagement with pins fixed to and projecting from the studs.

In testimony whereof we have affixed our signatures.

GEORGE E. HOLMES.
FRANK W. GRANT.